United States Patent [19]
Mancuso

[11] Patent Number: 5,866,191
[45] Date of Patent: Feb. 2, 1999

[54] SOFT-FROZEN DRINK COMPOSITION

[76] Inventor: John J. Mancuso, 23-72 Crescent St., Astoria, N.Y. 11105-3108

[21] Appl. No.: 738,836

[22] Filed: Oct. 28, 1996

[51] Int. Cl.$^6$ .................. C12G 3/04; C12G 3/06
[52] U.S. Cl. .............. 426/592; 426/330.4; 426/599
[58] Field of Search .................. 426/590, 592, 426/599, 616, 654, 330.4, 524

[56] References Cited

U.S. PATENT DOCUMENTS

| 3,619,205 | 11/1971 | Le Van et al. | 426/590 |
| 3,647,472 | 3/1972 | Speech et al. | 426/115 |
| 3,826,829 | 7/1974 | Marulich | 426/590 |

OTHER PUBLICATIONS

Code of Federal Regulations, 21 CFR 184.1666, Apr. 1983.

Primary Examiner—Curtis E. Sherrer
Attorney, Agent, or Firm—Michael I. Kroll

[57] ABSTRACT

The present invention relates to a beverage composition which remains substantially liquid at freezer temperatures as low as at least 0° F. (about –18° C.). These beverages, which can optionally contain alcohol, contain, as an ice crystal formation inhibitor, either glycerol or propylene glycol, generally from about 6 to about 20 percent of said composition on a volume basis, and usually from about 10 to about 15 percent of said composition. These beverages, when placed in a freezer, remain soft and can be readily poured, squeezed or spooned into an appropriate serving container for consumption.

1 Claim, 3 Drawing Sheets

24 R=H or OH

32 Glycerol 34 (1,2,3-propanetriol)

42  Propylene glycol 44  (1,2-propanediol)

50

SOFT-FROZEN DRINK COMPOSITION

BACKGROUND OF THE INVENTION

1. Field of the Invention

The instant invention relates generally to beverage compositions and more specifically it relates to beverage compositions which remain soft and readily spoonable when subjected to freezing temperatures.

2. Description of the Prior Art

While beverage compositions are well known in the art, beverage compositions which remain soft and pliable at freezer temperatures (0° F., or about −18° C., and lower) remain elusive.

U.S. Pat. No. 4,235,936 (Kahn et. al., 25 Nov. 1980) discloses frozen drink concentrates (orange juice, tea) which remain substantially non-crystalline at freezer temperatures. The compositions contain high concentrations of sugar and are suitable only for beverage concentrates.

U.S. Pat. No. 5,296,251 (Ishida et. al., 22 Mar. 1994) discloses liquors which are maintained at supercooled temperatures under pressure and which freeze into a sherbet-like state when poured into an unpressurized container.

SUMMARY OF THE INVENTION

The present invention is concerned with a beverage composition which remains substantially liquid at freezer temperatures as low as at least 0° F. (about −18° C.). These beverages contain an ice crystal formation inhibitor selected from low molecular weight alcohols and glycols. These beverages, when placed in a freezer, remain soft and can be readily poured, squeezed or spooned into an appropriate serving container for consumption.

A primary object of the present invention is to provide a beverage composition which remains substantially liquid at freezer temperatures as low as at least 0° F. (about −18° C.).

Another object of the present invention is to provide a beverage composition containing an ice crystal formation inhibitor selected from low molecular weight alcohols and glycols.

An additional object of the present invention is to provide a beverage composition containing an ice crystal formation inhibitor selected from ethanol, glycerol, propylene glycol or a combination thereof.

A further object of the present invention is to provide a beverage composition which can attain a desired consistency depending on the freezer temperature and the proportional amount of the ice crystal formation inhibitor in the composition.

A still further object of the present invention is to provide a beverage composition containing a mixture of fruit juice and glycerol which will attain a spoonable, soft sherbet-like consistency at temperatures near 0° F. (about −18° C.).

A still further object of the present invention is to provide an alcoholic cocktail beverage composition containing a mixture of a flavor base liquid, alcohol and glycerol which will attain a spoonable, soft sherbet-like consistency at temperatures near 0° F. (about −18° C.).

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS UTILIZED IN THE DRAWINGS

Figure 1:
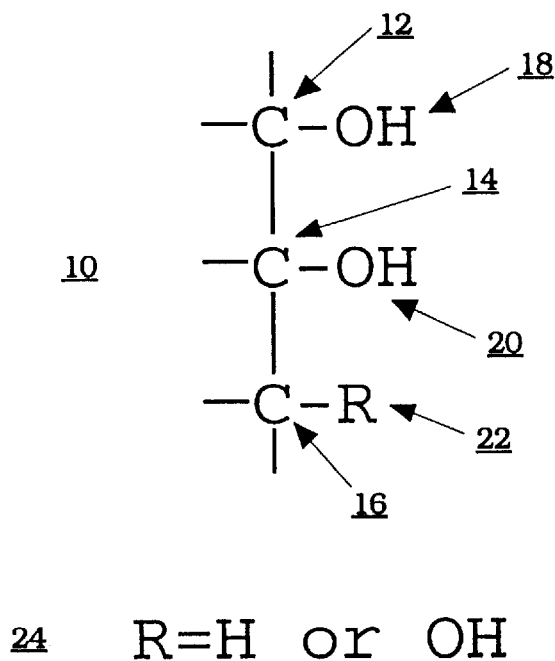
FIG. 1 is a Fischer projection chemical drawing showing the structure of the general class of compounds utilized as ice crystal formation inhibitors in the beverages of the present invention.

10 chemical structure for the preferred class of compounds for inhibiting ice crystal formation

12 the three carbon atoms which form the backbone of 10

14 hydroxyl group attached to the terminal carbon atom 12

16 hydroxyl group attached to the central carbon atom 12

18 R group attached to 16

20 definition of R group 18 as either hydrogen or hydroxy

30 chemical structure of the preferred compound, when R is hydroxy

32 informal name of the preferred compound 30, glycerol

34 IUPAC name of the preferred compound 30, 1,2,3-propanetriol

40 chemical structure of the compound 10, when R is hydrogen

42 informal name of the compound 40, propylene glycol

44 IUPAC name of the compound 40, 1,2-propanediol

50 serving container (drinking glass)

52 beverage of the present invention, which has been poured, squeezed or spooned into serving container 50

54 drinking straw

56 garnish

60 initially, a standard drink is prepared

62 to the standard drink 60, an appropriate amount of an ice crystal formation inhibitor is added 64 the drink and ice crystal formation inhibitor are mixed thoroughly 66 the mixed beverage is sealed in a storage container 68 the sealed container can be stored at refrigeration temperature, or, when appropriate, at room temperature 70 before use, the storage container is placed in a freezer until a slushy consistency is achieved 72 when ready for consumption, the storage container is removed from the freezer 74 the now slushy beverage is transferred from the storage container to a serving container, for example, by pouring, squeezing or spooning, depending on the nature of the storage container and the final consistency of the beverage 76 the beverage is now ready for consumption

DETAILED DESCRIPTION OF THE PREFERRED EMBODIMENTS

Turning now descriptively to the drawings, in which similar reference characters denote similar elements throughout the several views, the Figures illustrate the preparation and use of a beverage composition which will remain liquid at temperatures near 0° F. (about −18° C.). By "liquid" it is meant that, at the prescribed temperatures, the composition remains fluid, that is, it will tend to take the shape of its container and seek the lowest level therein. This includes a readily pourable consistency and also a soft, sherbet-like consistency which may pour quite slowly, but which can be spooned quite easily and drawn, with some effort, through a straw, similar to that of slushy refreshment drinks such as those sold at convenience stores.

Figure 2:
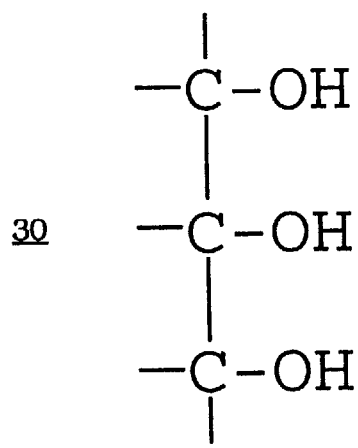
FIG. 2 is a Fischer projection chemical drawing showing the structure of glycerol (1,2,3-propanetriol), the most preferred ice crystal formation inhibitor of the present invention.
Figure 3:
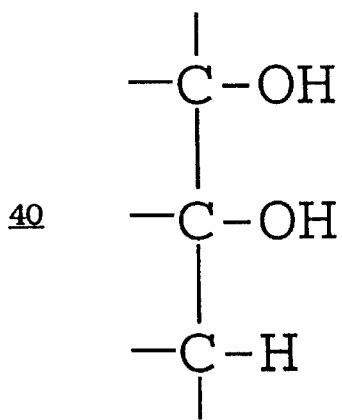
FIG. 3 is a Fischer projection chemical drawing showing the structure of propylene glycol (1,2-propanediol), another preferred ice crystal formation inhibitor of the present invention.
Figure 4:
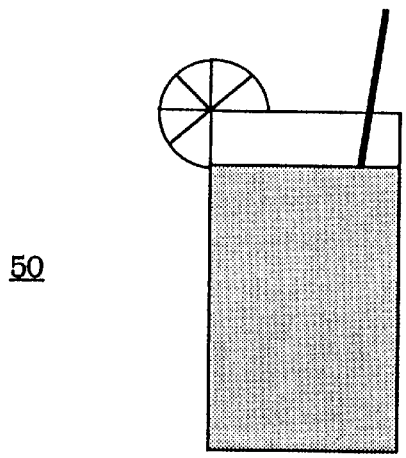
FIG. 4 is an illustration of a beverage of the present invention ready for consumption.
Figure 5:
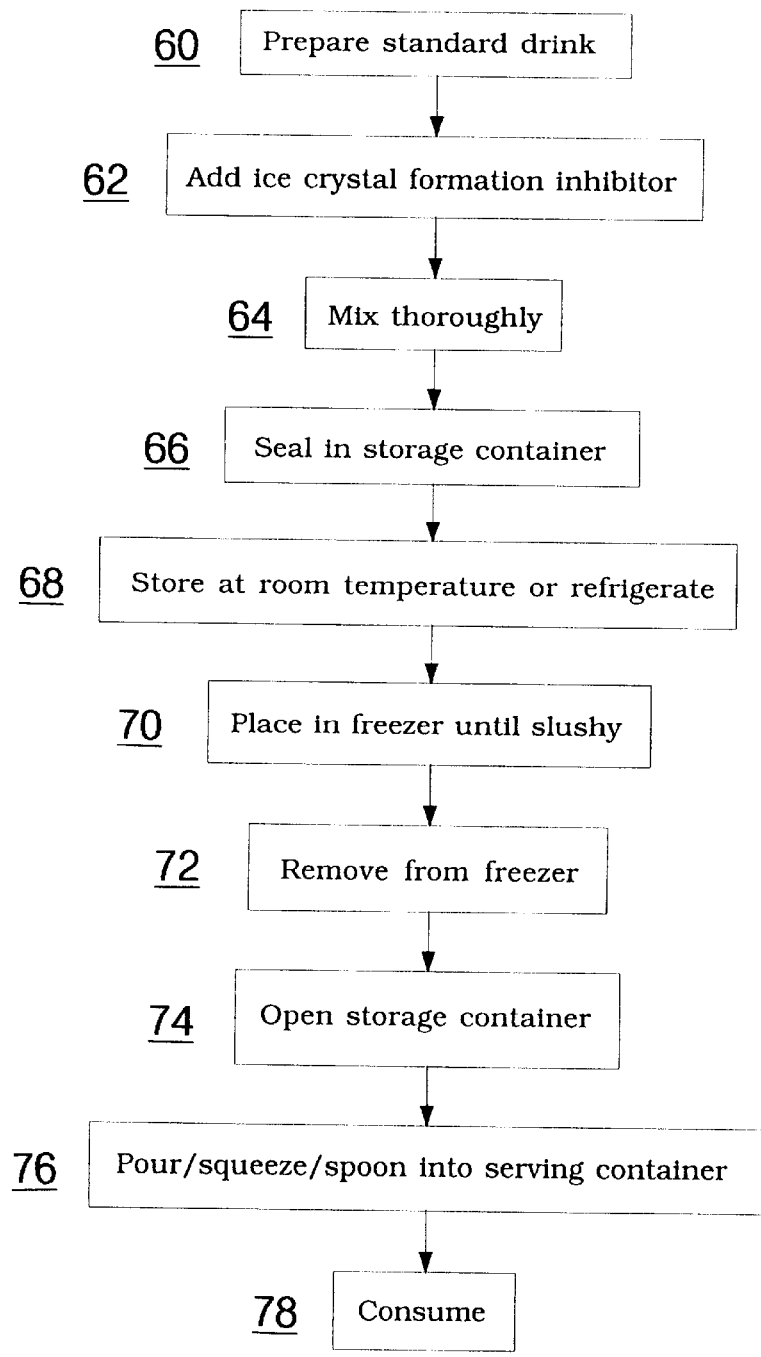
FIG. 5 is a flowchart illustrating the major steps in the preparation (60 through 68) and use (70 through 78) of the beverages of the present invention.

When placed in a freezer at 0° F. (about −18° C.), beverages will generally freeze into a hard, solid mass. By adding ice crystal formation inhibitors to conventional beverages, such freezing can be prevented. The present invention utilizes low molecular weight glycols, optionally in combination with ethanol, to prevent such ice crystal formation. FIGS. 1 through 3 illustrate the preferred class of ice crystal formation inhibitors, namely, those compounds of the formula $CH_2OH—CHOH—CH_2R$, wherein R is H or OH. It can readily be appreciated that when R is H, the compound is propylene glycol, also known by its proper IUPAC name, 1,2-propanediol. When R is OH, the compound is glycerol, also known by its proper IUPAC name, 1,2,3-propanetriol. Of these compounds, glycerol is preferred.

When added to a standard beverage in a functional amount, these compounds prevent the beverage from freezing solid in a freezer. This functional amount will vary depending on the temperature of the freezer and the desired consistency, but generally will be from about 6 to about 20 percent of said composition, on a volume basis. It is anticipated that the functional amount will most often be within about 10 to about 15 percent of said composition, preferably from about 12 to about 14 percent.

In its most basic embodiment, the compositions of the present invention comprise fruit juice in combination with the ice crystal formation inhibitor. For example, glycerol can be mixed with one or more juices such as orange, apple, grape, cranberry, kiwi, passion, strawberry, mango, banana, pineapple, peach, raspberry, blackberry, tomato and the like. In such compositions, it has been found that about 13 percent glycerol and 87 percent juice, by volume, results in a consistently acceptable product, although the range can vary as described above with good results.

For example, compositions of the present invention will generally contain from about 80 to about 94 percent fruit juice and from about 6 to about 20 percent glycerol, on a volume basis, usually from about 85 to about 90 percent fruit juice and from about 10 to about 15 percent glycerol, and preferably from about 86 to about 88 percent fruit juice and from about 12 to about 14 percent glycerol.

The juice/glycerol compositions described above are particularly suited for desserts and snack drinks. For example, the composition can be poured into cups, bowls or any suitable serving container, either before or after being placed in the freezer. With cooling, the composition will achieve a consistency ranging from substantially liquid, for drinking, to a soft sherbet-like consistency, for eating with a spoon.

The present invention also finds particular utility with regard to cocktail (alcohol-containing) beverages. In such cases, the alcohol (ethanol) will generally comprise from about 2 to about 15 percent of the total composition, on a volume basis, more usually from about 4 to about 10 percent, preferably from about 5 to about 8 percent. For these beverages, the remainder of the composition will primarily comprise a flavor base liquid. For example, any of the juices described above can be utilized, as can other liquids which are generally specific to cocktails, such as, for example, margarita mix, daiquiri mix, pina colada mix, sour mixes, bloody mary mix, tonic water and the like. Furthermore, the ethanol will generally be provided in the form of a typical liquor, for example vodka, rum, gin, whiskey, tequila and the like. These typical liquors are generally about 80 to 100 proof (40 to 50 percent ethanol), with the remaining 50 to 60 percent being water and minor flavor constituents. For the purposes of this description, the ethanol is defined strictly as the ethanol content of the liquor, not the total liquor (e.g. vodka, rum) content. For example, if a composition contains 6 percent ethanol and 12 percent glycerol in an orange juice base, and the ethanol comes from 80 proof vodka, then the overall composition contains 6 percent ethanol, 12 percent glycerol, 9 percent water from the vodka, and 73 percent orange juice. It can thus be appreciated that, in cocktails of the present invention, the non-ethanol portion of the liquor will decrease the relative amount of flavor base liquid, as compared with non-alcoholic beverages. For example, it is anticipated that the base flavor liquid will generally comprise from about 50 to about 88 percent of the total composition, on a volume basis, usually from about 50 to about 86 percent, and preferably from about 50 to about 85 percent.

It will be understood that each of the elements described above, or two or more together, may also find a useful application in other types of applications differing from the type described above.

While the invention has been illustrated and described as embodied in a soft-frozen beverage composition, it is not intended to be limited to the details shown, since it will be understood that various omissions, modifications, substitutions and changes in the forms and details of the formulation illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of this invention.

What is claimed as new and desired to be protected by Letters Patent is set forth in the appended claims:

I claim:

1. A beverage composition which remains substantially liquid at temperatures down to at least about −18° C. comprising, a base flavor liquid selected from one or more of juice, margarita mix, daiquiri mix, pina colada mix, sour mix, bloody mary mix, and tonic water with ethanol in the amount of from about 2 to about 15 percent of said composition on a volume basis, and, as an ice crystal formation inhibitor, 1,2-propylene glycol in the amount of from about 12 to about 14 percent of said composition on a volume basis.

* * * * *